(12) United States Patent
Hsiao et al.

(10) Patent No.: US 9,121,973 B2
(45) Date of Patent: Sep. 1, 2015

(54) WAFER LEVEL LENS, LENS SHEET AND MANUFACTURING METHOD THEREOF

(71) Applicant: HIMAX TECHNOLOGIES LIMITED, Tainan (TW)

(72) Inventors: Yun-Lien Hsiao, Tainan (TW); Shu-Hao Hsu, Tainan (TW); Wei-Hsin Lin, Tainan (TW); Shih-Wei Yeh, Tainan (TW); Jen-Hui Lai, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 31 days.

(21) Appl. No.: 14/036,485

(22) Filed: Sep. 25, 2013

(65) Prior Publication Data

US 2014/0098433 A1   Apr. 10, 2014

Related U.S. Application Data

(60) Provisional application No. 61/710,001, filed on Oct. 5, 2012.

(51) Int. Cl.
*B29D 11/00* (2006.01)
*G02B 7/02* (2006.01)
*G02B 3/00* (2006.01)
*G02B 13/00* (2006.01)

(52) U.S. Cl.
CPC .. *G02B 3/00* (2013.01); *G02B 7/02* (2013.01); *G02B 13/0085* (2013.01); *Y10T 29/49769* (2015.01); *Y10T 29/49778* (2015.01); *Y10T 29/49826* (2015.01)

(58) Field of Classification Search
USPC .................................................. 264/1.1, 1.7
IPC .............. B29D 11/00403,11/0073; G02B 3/00, G02B 7/02, 13/0085; Y10T 29/49826, 29/49778, 29/49769
See application file for complete search history.

(56) References Cited

U.S. PATENT DOCUMENTS 6,235,141 B1 * 5/2001 Feldman et al. .............. 156/250
7,645,628 B2   1/2010 Perkins
2012/0183288 A1 * 7/2012 Kishinami et al. ............ 396/505

FOREIGN PATENT DOCUMENTS

| CN | 102016653 | 4/2011 |
| CN | 102472839 | 5/2012 |
| TW | 200835307 | 8/2008 |
| TW | 200923462 | 6/2009 |
| TW | 201111855 | 4/2011 |
| TW | 201122612 | 7/2011 |
| TW | 201122702 | 7/2011 |

OTHER PUBLICATIONS

"Office Action of Taiwan Counterpart Application", issued on Nov. 13, 2014, p. 1-p. 12.

* cited by examiner

*Primary Examiner* — Mathieu Vargot
(74) *Attorney, Agent, or Firm* — J.C. Patents

(57) ABSTRACT

A method of manufacturing a lens sheet including following steps is provided. A first structure is provided. The first structure includes a first transparent substrate and a first lens film attached to the first transparent substrate. A second structure is provided. The second structure includes a second transparent substrate and a second lens film. The second transparent substrate has a first surface and a second surface opposite to the first surface. The second lens film is attached to the first surface. The first lens film is attached to the second lens film. A third lens film is formed on the second surface of the second substrate after the first lens film is attached to the second lens film. Moreover, a lens sheet and a wafer level lens are also provided.

12 Claims, 9 Drawing Sheets

WAFER LEVEL LENS, LENS SHEET AND MANUFACTURING METHOD THEREOF

CROSS-REFERENCE TO RELATED APPLICATION

This application claims the priority benefits of U.S. provisional application Ser. No. 61/710,001, filed on Oct. 5, 2012. The entirety of the above-mentioned patent applications is hereby incorporated by reference herein and made a part of this specification.

BACKGROUND OF THE INVENTION

1. Field of the Invention

The present invention relates to an optical component and a method of manufacturing the same. More particularly, the present invention relates to a wafer-level lens, a lens sheet and a method of manufacturing the lens sheet.

2. Description of Related Art

In response to the trend of miniaturized and low-cost electronic products, the development of wafer-level module (WLM) technique draws the most attention. The WLM technique is mainly to miniaturize the electronic products by the wafer-level manufacturing technique. For example, by applying the WLM technique to the manufacture of a lens, the volume of the lens is much smaller than the volume of a traditional lens, the technique this can be applied to the camera modules of the electronic products such as laptop, tablet PC, mobile phone, etc.

In general, wafer-level lens is cut from a lens sheet including a plurality of lenses. The lens sheet may include a transparent substrate and two lens films respectively disposed on two opposing surfaces of the transparent substrate. However, with the increase in image quality demands from customers, the image quality of the wafer-level lens cut from the lens sheet including only two lens films can no longer satisfy the demands from customers. Therefore, a lens sheet including a plurality of transparent substrates and a plurality of lens films is provided. In the process of the lens sheet, two transparent substrates having lens films are needed to be attached to each other. However, during the attaching process, the lens films of different transparent substrates are not easily to be aligned, so as to impair the optical property of the wafer-level lens cut from the lens sheet.

SUMMARY OF THE INVENTION

The present invention provides a method of manufacturing a lens sheet, wherein optical property of the manufactured lens sheet is satisfactory.

The present invention further provides a lens sheet and a wafer-level lens, wherein the optical property thereof is satisfactory.

One embodiment of the present invention provides a method of manufacturing a lens sheet, and the method includes following steps. a first structure is provided. The first structure includes a first transparent substrate and a first lens film attached to the first transparent substrate. A second structure is provided. The second structure includes a second transparent substrate and a second lens film. The second transparent substrate has a first surface and a second surface opposite to the first surface. The second lens film is attached to the first surface. The first lens film is attached to the second lens film. A third lens film is formed on the second surface of the second transparent substrate after the first lens film is attached to the second lens film.

One embodiment of the present invention provides a lens sheet. The lens sheet includes a first transparent substrate, a first lens film disposed on the first transparent substrate and having a plurality of first lens portions and a plurality of first carrying portions, a second lens film, second transparent substrate, a plurality of bonding material patterns and a plurality of buffer cavities. The second lens film is disposed between the second transparent substrate and the first lens film. The bonding material patterns are disposed between the second lens film and the first carrying portions. The buffer cavities are located between the first carrying portions and the first lens portions.

One embodiment of the present invention provides a wafer-level lens. The wafer-level lens includes a first transparent substrate, a first lens film, a second lens film, a second transparent substrate, a bonding material pattern and a buffer cavity. The first lens film is disposed on the first transparent substrate, and has a first lens portion and a first carrying portion. The second lens film is disposed between the second transparent substrate and the first lens film. The bonding material pattern is disposed between the second lens film and the first carrying portion. The buffer cavity is located between the first carrying portion and the first lens portion.

According to one embodiment of the present invention, the method further includes: inspecting an alignment condition between the first structure and the second structure to obtain an inspecting result.

According to one embodiment of the present invention, the method of forming the third lens film on the second surface of the second transparent substrate includes: forming the third lens film on the second surface of the second transparent substrate according to the inspecting result.

According to one embodiment of the present invention, the first lens film has a plurality of first lens portions, the second lens film has a plurality of second lens portions corresponding to the first lens portions, and the method of inspecting the alignment condition between the first structure and the second structure includes: measuring a distance between a first light axis of any one of the first lens portions and a second light axis of the corresponding second lens portion to obtain a first offset.

According to one embodiment of the present invention, a first pre-lens is formed with any one of the first lens portions and the corresponding second lens portion, and the method of inspecting the alignment condition between the first structure and the second structure includes: measuring an optical property of the first pre-lens.

According to one embodiment of the present invention, the first structure further comprises a fourth lens film, the first transparent substrate has a third surface and a fourth surface opposite to the third surface, the first lens film is attached to the third surface, the fourth lens film is attached to the fourth surface, the first lens film has a plurality of first lens portions, the second lens film has a plurality of second lens portions corresponding to the first lens portions, the fourth lens film has a plurality of fourth lens portions corresponding to the first lens portions, and the method of inspecting the alignment condition between the first structure and the second structure includes: measuring distances between a first light axis of any one of the first lens portions, a second light axis of the corresponding second lens portion and a fourth light axis of the fourth lens portion to obtain a first offset and a second offset.

According to one embodiment of the present invention, a second pre-lens is formed with any one of the first lens portions, the corresponding second lens portion and the corresponding fourth lens portion, and the method of inspecting the alignment condition between the first structure and the second structure includes: measuring an optical property of the second pre-lens.

According to one embodiment of the present invention, the optical property includes a focus or a modulation transfer function (MTF).

According to an embodiment of the present invention, the first lens film has a plurality of first lens portions and a plurality of first carrying portions, the second lens film has a plurality of second lens portions corresponding to the first lens portions, and a plurality of second carrying portions corresponding to the first carrying portions, and the method of manufacturing the lens sheet further includes: forming a plurality of bonding material patterns on the first carrying portions or the second carrying portions.

According to one embodiment of the present invention, the first lens film further has a plurality of first connecting portions. The first connecting portions are connected to the first lens portions and the first carrying portions, and the buffer cavities are formed in the first connecting portions.

According to one embodiment of the present invention, the first lens portions are surrounded by the buffer cavities and the buffer cavities are surrounded by the first carrying portions.

According to one embodiment of the present invention, each of the buffer cavities is an annular trench.

Based on the above, in the method of manufacturing the lens sheet according to one embodiment of the present invention, the third lens film is formed after the first lens film is attached to the second lens film, so when the alignment condition between the first lens film and the second lens film is not satisfactory, the third lens film can be used to compensate for the alignment offset between the first lens film and the second lens film, such that the optical property of the lens sheet is still satisfactory.

In addition, for the lens sheet and the wafer-level lens of one embodiment of the present invention, by disposing the buffer cavities between the first carrying portions and the first lens portions, the bonding material patterns striding across the buffer cavities and contaminating the first lens portions or the second lens portions can be prevented. Therefore, the yield rate and the reliability of the lens sheet and the wafer-level lens can be enhanced.

In order to make the aforementioned and other features and advantages of the invention more comprehensible, embodiments accompanying figures are described in detail below.

DESCRIPTION OF EMBODIMENTS

Method of Manufacturing a Lens Sheet

Figure 1:
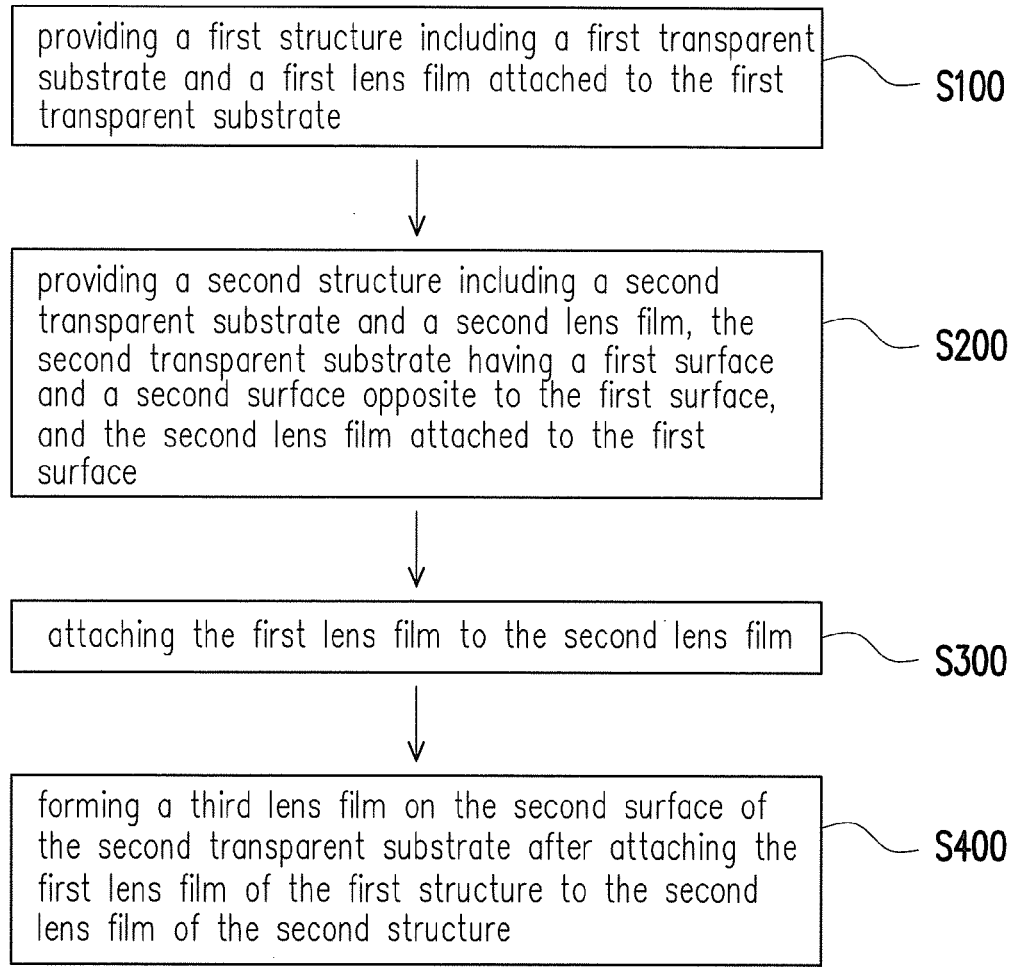
FIG. 1 is a flowchart illustrating a method of manufacturing a lens sheet according to an embodiment of the invention.

FIG. 1 is a flowchart illustrating a method of manufacturing a lens sheet according to an embodiment of the invention. Referring to FIG. 1A, the method of manufacturing a lens sheet of the present embodiment includes the following steps. A first structure is provided. The first structure includes a first transparent substrate and a first lens film attached to the first transparent substrate (Step 100). A second structure is provided. The second structure includes a second transparent substrate and a second lens film. The second transparent substrate has a first surface and a second surface opposite to the first surface, and the second lens film is attached to the first surface (Step 200). The first lens film of the first structure is attached to the second lens film of the second structure (Step 300). A third lens film is formed on the second surface of the second transparent substrate after the first lens film of the first structure is attached to the second lens film of the second structure (Step 400). It should be noted that the sequence of the aforementioned steps S100, S200, S300, S400 is not restricted to the above, and the modifications of the sequence can be made. For example, Step S200 can be performed firstly, and then the step S100, step S300 and step S400 are sequentially performed.

Figure 2A:
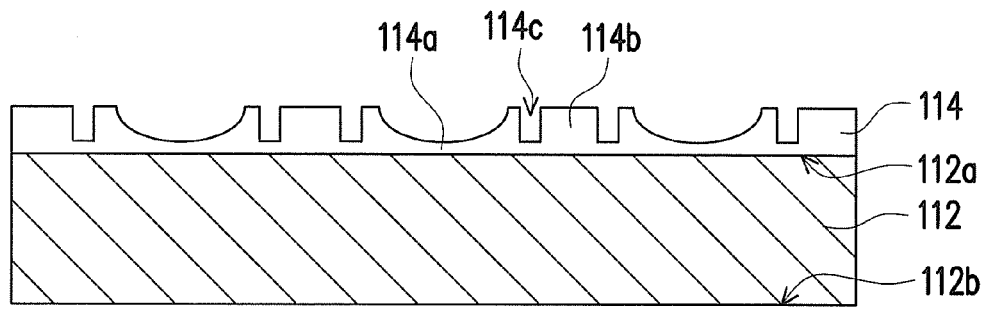
FIGS. 2A to 2F are schematic cross-sectional views illustrating a method of manufacturing a lens sheet according to an embodiment of the present invention.
Figure 2B:
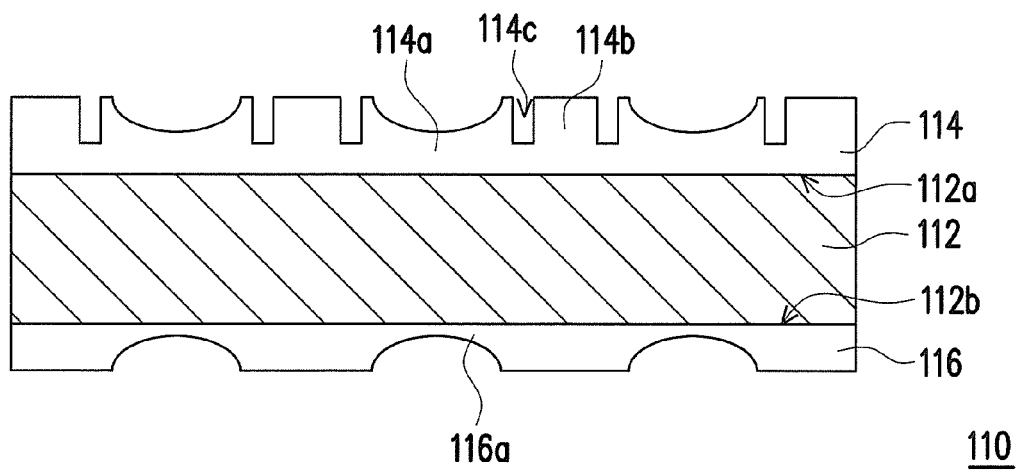

With reference to FIGS. 2A-2F, a detailed description is provided hereinafter for a method of manufacturing a lens sheet according to an embodiment of the present invention. FIGS. 2A to 2F are schematic cross-sectional views illustrating a method of manufacturing a lens sheet according to an embodiment of the present invention. Referring to FIGS. 2A and 2B, Firstly, a first structure 110 is provided. The first structure 110 includes a first transparent substrate 112 and a first lens film 114 attached to the first transparent substrate 112. In the present embodiment, the first structure 110 may further include a fourth lens film.

In detail, the method of providing the first structure 110 may include following steps. Referring to FIG. 2A, firstly, a first transparent substrate 112 is provided. The first transparent substrate 112 has a third surface 112a and a fourth surface 112b. In the present embodiment, the first transparent substrate 112 can be a glass substrate, such as glass wafer. However, the present invention is not limited thereto. In other embodiments, the first transparent substrate 112 can also be a transparent substrate with other material.

Next, a first lens film 114 is formed on the third surface 112a of the first transparent substrate 112. In the present embodiment, the method of forming the first lens film 114 is as follows. Firstly, a material layer is coated on the third surface 112a of the first transparent substrate 112. Then, the material layer is molded into a shape of the first lens film 114 by a mold. Afterward, the material layer is cured to form the first lens film 114. The first lens film 114 of the present embodiment has a plurality of first lens portions 114a, a plurality of first carrying portions 114b and a plurality of buffer cavities 114c located between the first lens portions 114a and the first carrying portions 114b. In the present embodiment, the first lens portions 114a are, for example, concave lenses. However, the present invention is not limited thereto. In other embodiments, the first lens portions 114a can also be convex lenses or other types of lenses.

Referring to FIG. 2B, next, a fourth lens film 116 is formed on the fourth surface 112b of the first transparent substrate 112. In the present embodiment, the method of forming the fourth lens film 116 is similar to the method of forming the first lens film 114 described above, and therefore will not be repeated hereinafter. The fourth lens film 116 of the present embodiment has a plurality of fourth lens portions 116a corresponding to the first lens portions 114a. In the present embodiment, the fourth lens portions 116a are, for example, concave lenses, however, the present invention is not limited thereto. Manufacturers may manufacture the fourth lens portions 116a into convex lenses or other types of lenses according to actual demands.

Figure 2C:
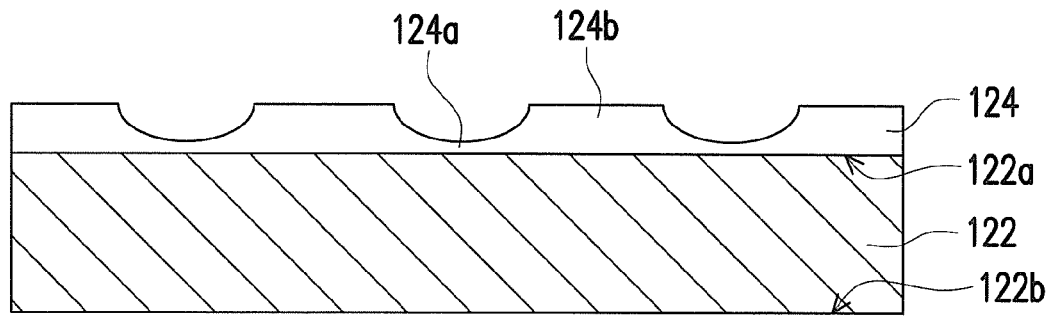

Referring to FIG. 2C, next, a second structure 120 is provided. The second structure 120 includes a second transparent substrate 122 and a second lens film 124. The second transparent substrate 122 has a first surface 122a and a second surface 122b. The second lens film 124 is attached to the first surface 122a. The second lens film 124 of the present embodiment has a plurality of second lens portions 124a and a plurality of second carrying portions 124b. The second carrying portions 124b are connected to the second lens portions 124a. The material suitable for the second transparent substrate 122 is similar to that suitable for the first transparent substrate 112. The types of the second lens portions 124a are similar to those of the first lens portions, and therefore will not be repeated hereinafter. In addition, the method of forming the second lens film 124 on the first surface 122a is also similar to the method of forming the first lens film 114 on the third surface 112a described above, and therefore will not be repeated hereinafter.

Figure 2D:
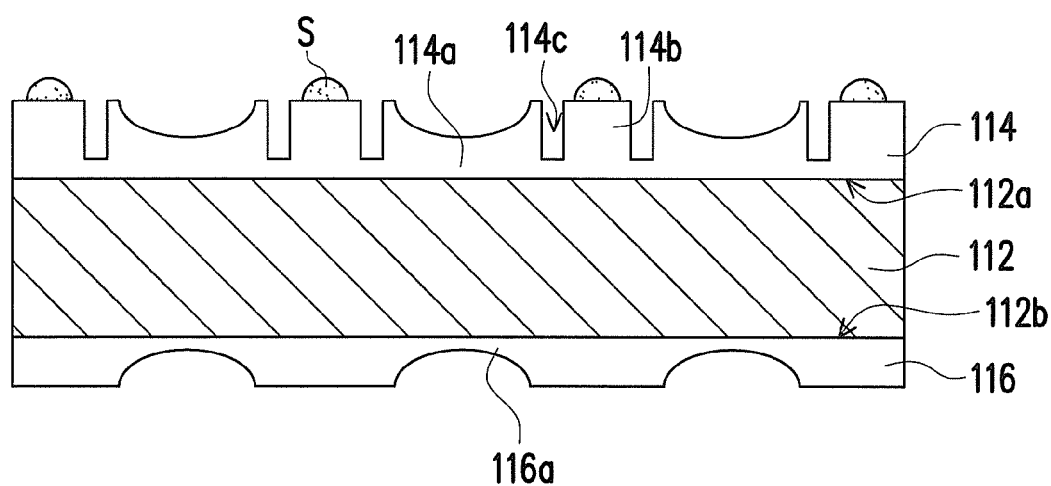
Figure 2E:
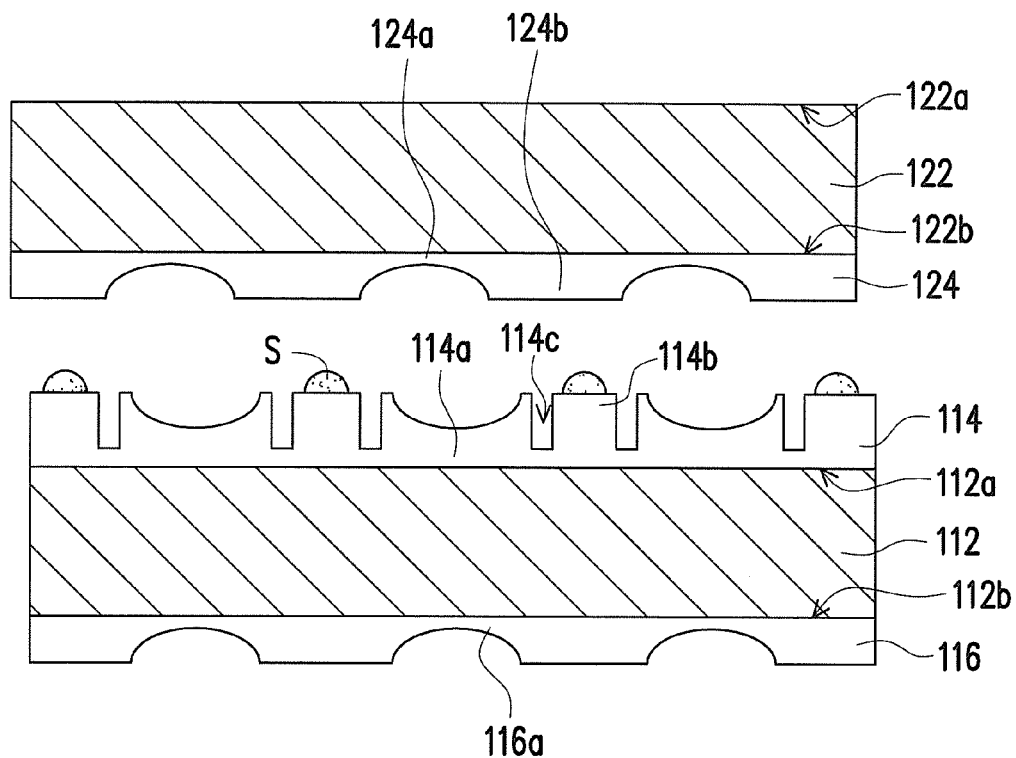

Referring to FIG. 2D, a bonding material patterns S is then formed on the first carrying portions 114b. Referring to FIG. 2E, then, the first lens film 114 is attached to the second lens film 124. However, the present invention is not limited thereto. In other embodiments, a plurality of bonding material patterns S may be formed on the second carrying portions 124b. Then, the first lens film 114 is attached to the second lens film 124. In the present embodiment, the bonding material patterns S may be liquid before being cured. To be specific, the bonding material patterns S can be light-curable glue, thermal-curable glue or other suitable glue material.

It should be noted that, the buffer cavities 114c are disposed between the first carrying portions 114b and the first lens portions 114a, so when the first lens film 114 is attached to the second lens film 124 by the bonding material patterns S, the bonding material patterns S can not easily pass the buffer cavities 114c and contaminate the first lens portions 114a or the second lens portions 124a. Hence, the yield rate of the lens sheet is greatly enhanced. Meanwhile, the reliability of the lens sheet may also be improved.

Figure 2F:
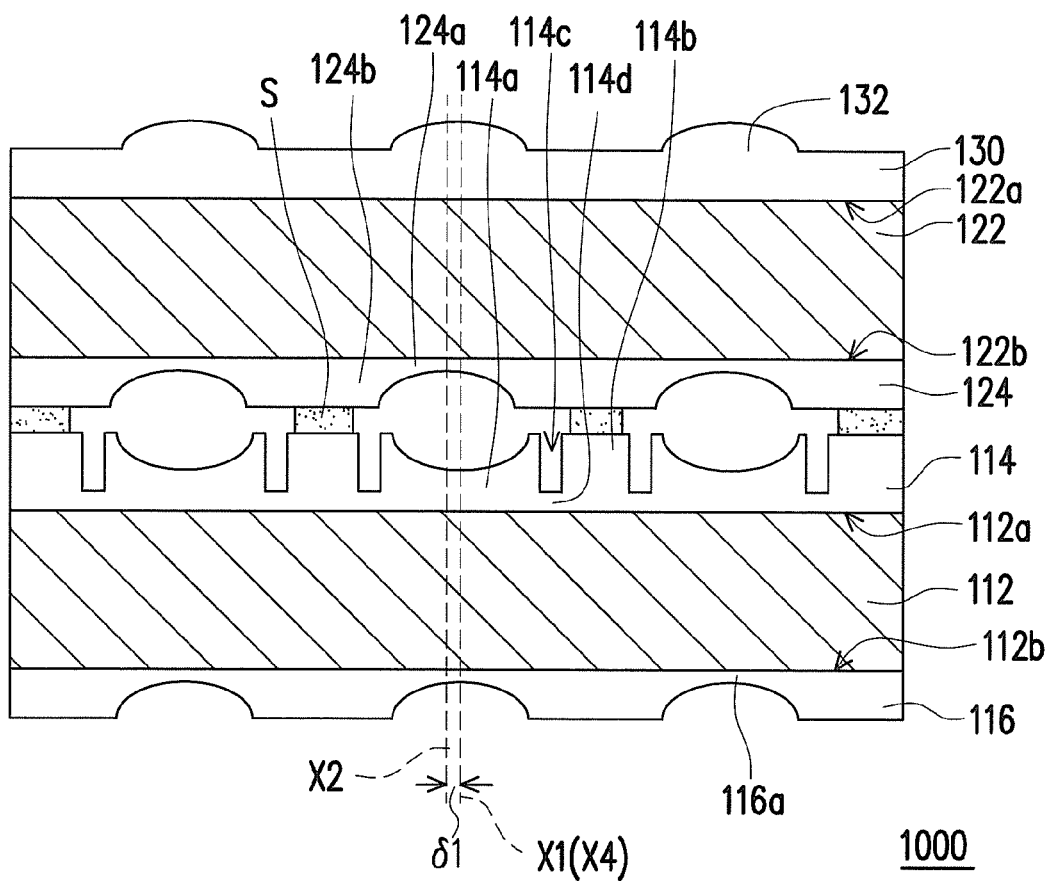

Referring to FIG. 2F, next, a third lens film 130 is formed on the second surface 122b of the second transparent substrate 122, so that the lens sheet 1000 of the present embodiment is finished. It should be noted that, the third lens film 130 is formed after the first lens film 114 is attached to the second lens film 124, so when the alignment condition between the first lens film 114 and the second lens film 124 is not satisfactory, the third lens film 130 can be used to compensate for the alignment offset between the first lens film 114 and the second lens film 124, such that the optical property of the lens sheet 1000 can meet the product specification.

In detail, before the third lens film 130 is formed, an alignment condition between the first structure 110 and the second structure 120 can be firstly inspected to obtain a inspecting result. Then, the third lens film 130 is formed on the second surface 122b according to the inspecting result. For example, a distance between a first light axis X1 of any one of the first lens portions 114a and a second light axis X2 of the corresponding second lens portion 124a is measured to obtain a first offset δ1. Then, the forming location of the third lens film 130 on the second surface 122b, or the shape of the third lens portions 132 of the third lens film 130 is adjusted according to the first offset δ1, so that the optical property of the lens sheet 1000 can be satisfactory. More specifically, if the first structure 110 includes the fourth lens film 114, a distance between the first light axis X1 of any one of the first lens portions 114a and a fourth light axis X4 of the corresponding fourth lens portion 116a is measured to obtain a first offset δ1. Then, the forming location of the third lens film 130 on the second surface 122b, or the shape of the third lens portions 132 of the third lens film 130 is adjusted according to the first offset δ1 and the second offset (not shown), so that the optical property of the lens sheet 1000 can meet the product specification.

The method of inspecting an alignment condition between the first structure 110 and the second structure 120 is not limited to the description above. In other embodiments, other suitable methods of may also be adopted to inspect the alignment condition between the first structure 110 and the second structure 120. For example, after the first lens film 114 is attached to the second lens film 124, a first pre-lens is formed with any one of the first lens portions 114a and the corresponding second lens portion 124a, and the method of inspecting the alignment condition between the first structure 110 and the second structure 120 includes measuring an optical property of the first pre-lens, for example, measuring the focus or the modulation transfer function (MTF) of the first pre-lens. Then, the forming location of the third lens film 130 on the second surface 122b, or the shapes of the third lens portions 132 is adjusted according to the optical measuring result, so that the optical property of the lens sheet 1000 can be satisfactory. To be more specific, if the first structure 110 includes the fourth lens film 116, a second pre-lens is formed with any one of the first lens portions 114a and the corresponding second lens portion 124a and the corresponding fourth lens portion 116a, and the method of inspecting the alignment condition between the first structure 110 and the second structure 120 includes measuring an optical property of the second pre-lens, for example, measuring the focus or the modulation transfer function (MTF) of the second pre-lens. Then, the forming location of the third lens film 130 on the second surface 122b, or the shapes of the third lens portions 132 is adjusted according to the optical measuring result, so that the optical property of the lens sheet 1000 can be satisfactory.

Figure 5A:
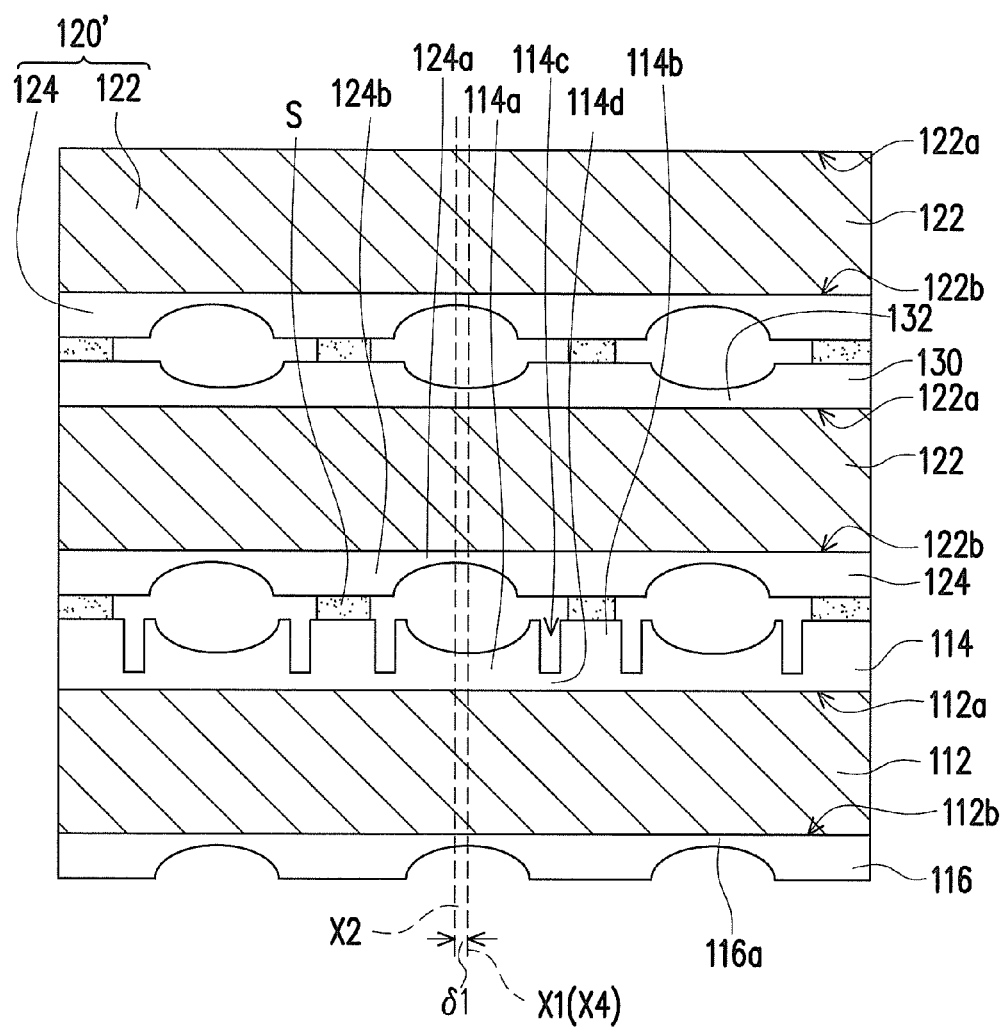
FIGS. 5A to 5B are schematic cross-sectional views illustrating a method of manufacturing a lens sheet according to other embodiment of the present invention.
Figure 5B:
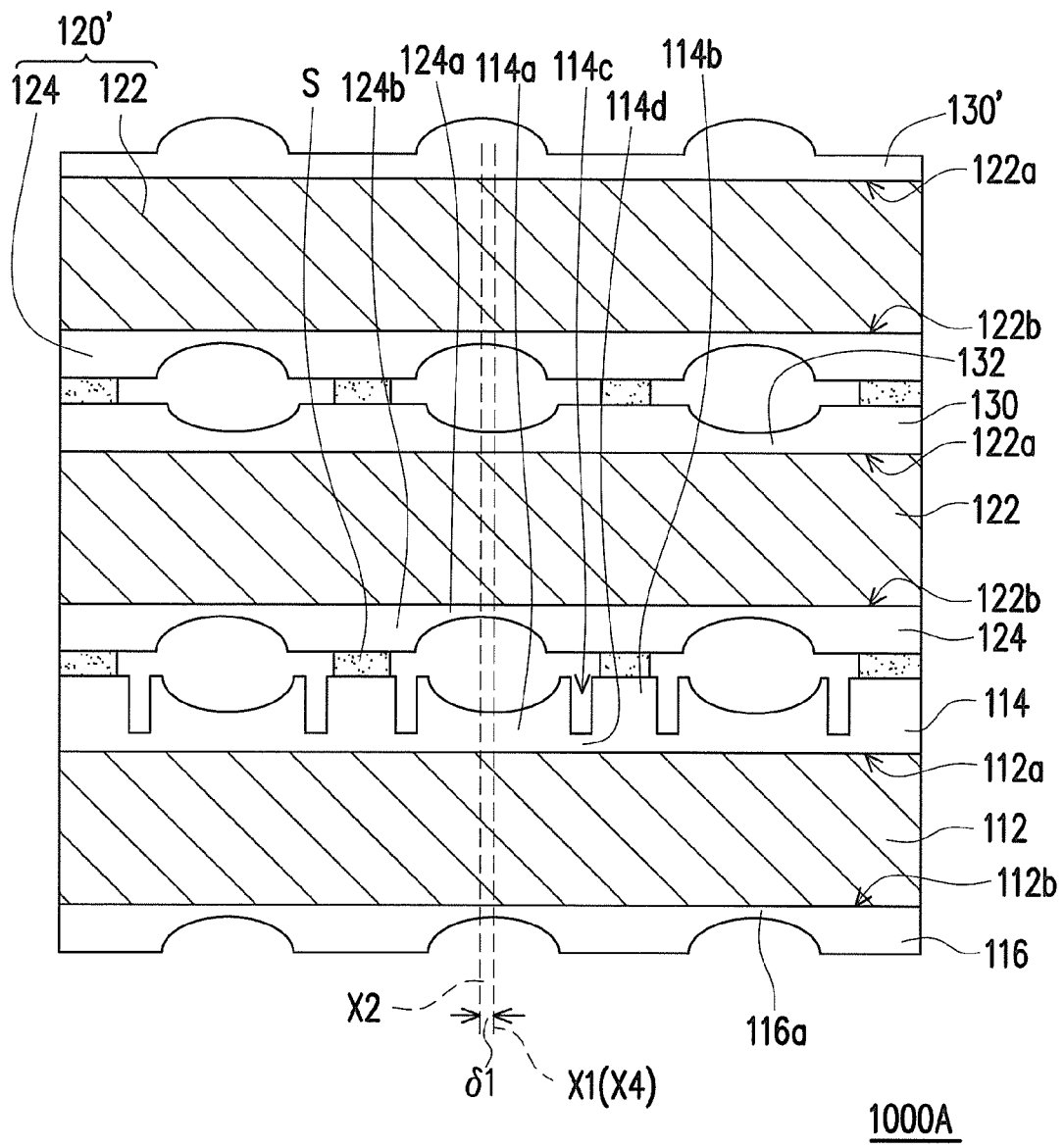

In other embodiment, the more steps of attaching the second lens film to a lens film and forming the third lens film on the second surface of the second transparent substrate may be practiced many times. The number of the practicing times may depend on the real remand. FIGS. 5A to 5B are schematic cross-sectional views illustrating a method of manufacturing a lens sheet according to other embodiment of the present invention. For example, referring to FIG. 5A, another second structure 120' may be attached to the third lens film 130. Referring to FIG. 5B, then, another third lens film 130' can be formed on the first surface 122a of the another second structure 120' by the way which is the same as the forming method of the third lens film 130, so that the lens sheet 1000A of the other embodiment is finished.

Lens Sheet

Referring to FIG. 2F, the lens sheet 1000 of the present embodiment includes a first transparent substrate 112, a first lens film 114 disposed on the first transparent substrate 112, a second lens film 124, a second transparent substrate 122, a plurality of bonding material patterns S and a plurality of buffer cavities 114c. The first lens film 114 has a plurality of first lens portions 114a and a plurality of first carrying portions 124b. The second lens film 124 is disposed between the second transparent substrate 122 and the first lens film 114. The bonding material patterns S are disposed between the second lens film 124 and the first carrying portions 114b. The buffer cavities 114c are located between the first carrying portions 114b and the first lens portions 114a. To be more specific, the first lens film 114 further has a plurality of first connecting portions 114d connected to the first lens portions 114a and the first carrying portions 114b, and the buffer cavities 114c are formed within the first connecting portions 114d.

Figure 3:
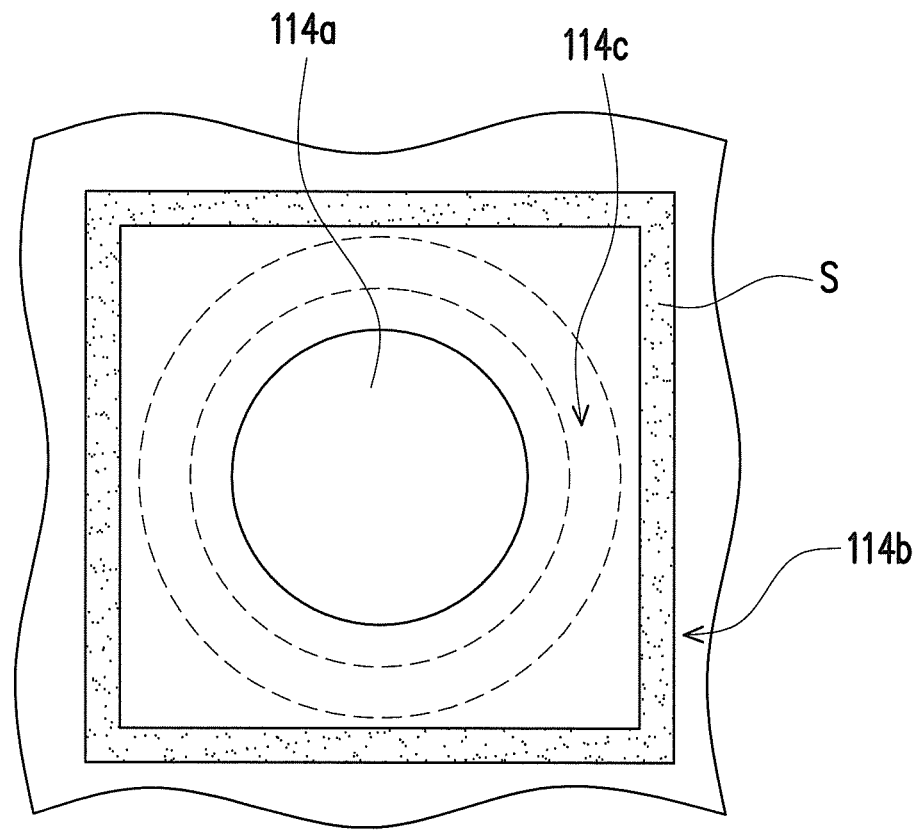
FIG. 3 is a schematic top view of the first lens film, the buffer cavities and the bonding material patterns in FIG. 2F.

FIG. 3 is a schematic top view of the first lens film, the buffer cavities and the bonding material patterns in FIG. 2F. Referring to FIG. 2F and FIG. 3, in the present embodiment, the first lens portions 114a are surrounded by the buffer cavities 114c and the buffer cavities 114c are surrounded by the first carrying portions 114b. To be more specific, the buffer cavities 114c are annular trenches. In the present embodiment, the annular trenches can be circular. However, the present invention is not limited thereto. In other embodiments, annular trenches can be circular, rectangular or other suitable shapes. Furthermore, the buffer cavities 114c can also not be a closed annularity. The buffer cavities 114c may include a plurality of buffer sub-cavities disposed between the first carrying portions 114b and the first lens portions 114a and separated from each other.

It should be noted that, the buffer cavities 114c are disposed between the first carrying portions 114b and the first lens portions 114a, so during the manufacturing process of the lens sheet 1000, the buffer cavities 114c can prevent the bonding material patterns S from striding across the buffer cavities 114c so as to contaminating the first lens portions 114a or the second lens portions 124a. Hence, the yield rate of the lens sheet 1000 can be greatly enhanced. Meanwhile, the reliability of the lens sheet 1000 can also be improved.

Wafer-Level Lens

Figure 4:
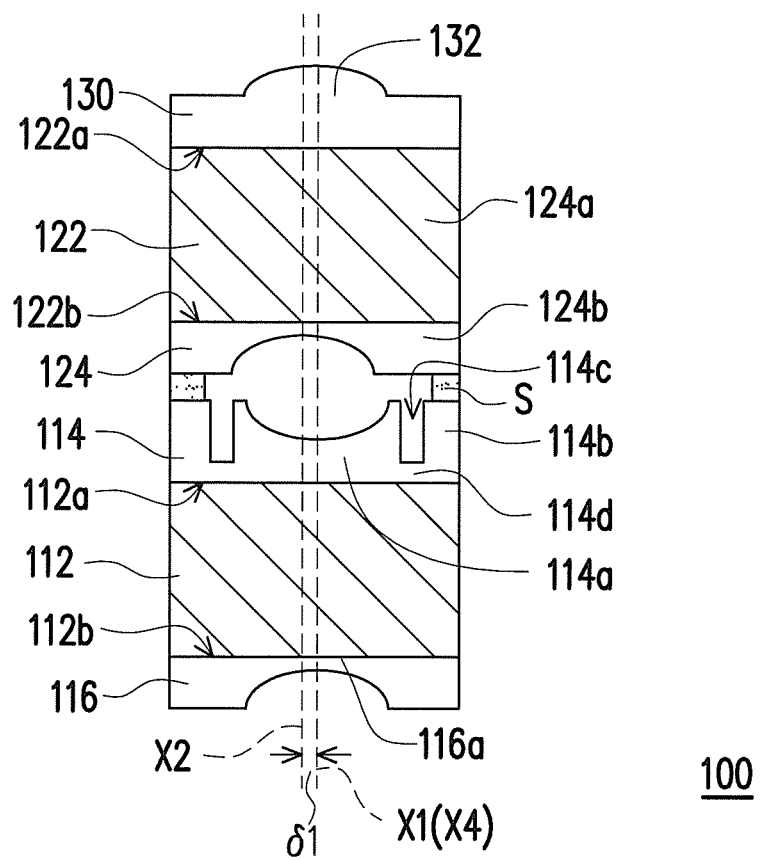
FIG. 4 is a schematic cross-sectional view of a wafer-level lens according to an embodiment of the present invention.

FIG. 4 is a schematic cross-sectional view of a wafer-level lens according to an embodiment of the present invention. Referring to FIG. 4, the wafer-level lens 100 of the present embodiment may be cut from the lens sheet 1000 in FIG. 2F. The wafer-level lens 100 of the present embodiment includes a first transparent substrate 112, a first lens film 114 disposed on the first transparent substrate 112, a second lens film 124, a second transparent substrate 122, a bonding material pattern S and a buffer cavity 114c. The first lens film 114 has a first lens portion 114a and a first carrying portion 124b. The second lens film 124 is disposed between the second transparent substrate 122 and the first lens film 114. The bonding material pattern S is disposed between the second lens film 124 and the first carrying portion 114b. The buffer cavity 114c is located between the first carrying portions 114b and the first lens portions 114a. To be more specific, the first lens film 114 further has a first connecting portion 114d connected to the first lens portion 114a and the first carrying portion 114b, and the buffer cavity 114c is formed within the first connecting portion 114d.

In the present embodiment, the first lens portion 114a is surrounded by the buffer cavity 114c and the buffer cavity 114c is surrounded by the first carrying portion 114b. To be more specific, the buffer cavity 114c is an annular trench. The annular trench may be circular, rectangular or other suitable shapes. However, the present invention is not limited thereto. In other embodiments, the buffer cavity 114c may also not be a closed annularity. The buffer cavity 114c may include a plurality of buffer sub-cavities disposed between the first carrying portion 114b and the first lens portion 114a and separated from each other.

Based on the above, in the method of manufacturing the lens sheet according to one embodiment of the present invention, the third lens film is formed after the first lens film is attached to the second lens film, so when the alignment condition between the first lens film and the second lens film is not satisfactory, the third lens film can be used to compensate for the alignment offset between the first lens film and the second lens film, such that the optical property of the lens sheet is still satisfactory.

In addition, for the lens sheet and the wafer-level lens according to the embodiments of the present invention, by disposing the buffer cavity between the first carrying portion and the first lens portion, the bonding material pattern striding across the buffer cavity and contaminating the first lens portion or the second lens portion can be prevented. Therefore, the yield rate and the reliability of the lens sheet and the wafer-level lens can be enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of manufacturing a lens sheet, the method comprising:
   providing a first structure, wherein the first structure includes a first transparent substrate and a first lens film attached to the first transparent substrate;
   providing a second structure, wherein the second structure includes a second transparent substrate and a second lens film, the second transparent substrate has a first surface and a second surface opposite to the first surface, and the second lens film is attached to the first surface;
   attaching the first lens film to the second lens film;
   forming a third lens film on the second surface of the second transparent substrate after attaching the first lens film to the second lens film; and
   inspecting an alignment condition between the first structure and the second structure to obtain an inspecting result,
   wherein the method of forming the third lens film on the second surface of the second transparent substrate comprises:
   forming the third lens film on the second surface of the second transparent substrate according to the inspecting result.

2. The method of manufacturing the lens sheet as claimed in claim 1, wherein the first lens film has a plurality of first lens portions, the second lens film has a plurality of second lens portions corresponding to the first lens portions, and the method of inspecting the alignment condition between the first structure and the second structure comprises:
   measuring a distance between a first light axis of any one of the first lens portions and a second light axis of the corresponding second lens portion to obtain a first offset.

3. The method of manufacturing the lens sheet as claimed in claim 1, wherein the first lens film has a plurality of first lens portions, the second lens film has a plurality of second lens portions corresponding to the first lens portions, after the first lens film is attached to the second lens film, a first pre-lens is formed with any one of the first lens portions and the corresponding second lens portion, and the method of inspecting the alignment condition between the first structure and the second structure comprises:
   measuring an optical property of the first pre-lens.

4. The method of manufacturing the lens sheet as claimed in claim 3, wherein the optical property comprises a focus or a modulation transfer function (MTF).

5. The method of manufacturing the lens sheet as claimed in claim 1, wherein the first structure further comprises a fourth lens film, the first transparent substrate has a third surface and a fourth surface opposite to the third surface, the first lens film is attached to the third surface, the fourth lens film is attached to the fourth surface, the first lens film has a plurality of first lens portions, the second lens film has a plurality of second lens portions corresponding to the first lens portions, the fourth lens film has a plurality of fourth lens portions corresponding to the first lens portions, and the method of inspecting the alignment condition between the first structure and the second structure comprises:

measuring distances between a first light axis of any one of the first lens portions, a second light axis of the corresponding second lens portion and a fourth light axis of the corresponding fourth lens portion to obtain a first offset and a second offset.

6. The method of manufacturing the lens sheet as claimed in claim 1, wherein the first structure further comprises a fourth lens film, the first transparent substrate has a third surface and a fourth surface opposite to the third surface, the first lens film is attached to the third surface, the fourth lens film is attached to the fourth surface, the first lens film has a plurality of first lens portions, the second lens film has a plurality of second lens portions corresponding to the first lens portions, the fourth lens film has a plurality of fourth lens portions corresponding to the first lens portions, after the first lens film of the first structure is attached to the second lens film of the second structure, a second pre-lens is formed with any one of the first lens portions, the corresponding second lens portion and the corresponding fourth lens portion, and the method of inspecting the alignment condition between the first structure and the second structure comprises:

measuring an optical property of the second pre-lens.

7. The method of manufacturing the lens sheet as claimed in claim 6, wherein the optical property comprises a focus or a modulation transfer function (MTF).

8. The method of manufacturing the lens sheet as claimed in claim 1, wherein the first lens film has a plurality of first lens portions and a plurality of first carrying portions, the second lens film has a plurality of second lens portions corresponding to the first lens portions, and a plurality of second carrying portions corresponding to the first carrying portions, and the method of manufacturing the lens sheet further comprises:

forming a plurality of bonding material patterns on the first carrying portions or the second carrying portions.

9. The method of manufacturing the lens sheet as claimed in claim 8, wherein the first lens film further has a plurality of buffer cavities, the buffer cavities are located between the first carrying portions and the first lens portions.

10. The method of manufacturing the lens sheet as claimed in claim 9, wherein the first lens film further has a plurality of first connecting portions, the first connecting portions are connected to the first lens portions and the first carrying portions, and the buffer cavities are formed within the first connecting portions.

11. The method of manufacturing the lens sheet as claimed in claim 9, wherein each of the first lens portions is surrounded by one of the buffer cavities, and each of the buffer cavities is surrounded by one of the first carrying portions.

12. The method of manufacturing the lens sheet as claimed in claim 11, wherein each of the buffer cavities is an annular trench.

* * * * *